United States Patent [19]
Fujimoto et al.

[11] Patent Number: 5,920,644
[45] Date of Patent: Jul. 6, 1999

[54] APPARATUS AND METHOD OF RECOGNIZING PATTERN THROUGH FEATURE SELECTION BY PROJECTING FEATURE VECTOR ON PARTIAL EIGENSPACE

[75] Inventors: Katsuhito Fujimoto; Hiroshi Kamada, both of Kawasaki, Japan

[73] Assignee: Fujitsu Limited, Kawasaki, Japan

[21] Appl. No.: 08/801,806

[22] Filed: Feb. 14, 1997

[30] Foreign Application Priority Data

Jun. 6, 1996 [JP] Japan .................................. 8-144109

[51] Int. Cl.⁶ .............................. G06K 9/62; G06K 9/64; G06K 9/66
[52] U.S. Cl. ......................... 382/159; 382/190; 382/197; 382/198; 382/218
[58] Field of Search .................................... 382/155, 159, 382/181, 190, 195, 197, 198, 206, 209, 217, 218, 278

[56] References Cited

U.S. PATENT DOCUMENTS

| | | | |
|---|---|---|---|
| 4,259,661 | 3/1981 | Todd | 382/205 |
| 4,752,957 | 6/1988 | Maeda | 395/2.13 |
| 4,926,491 | 5/1990 | Maeda et al. | 382/155 |
| 5,109,431 | 4/1992 | Nishiya et al. | 382/209 |
| 5,555,320 | 9/1996 | Irie et al. | 382/190 |
| 5,719,951 | 2/1998 | Shackleton et al. | 282/217 |
| 5,754,681 | 5/1998 | Watanabe et al. | 382/159 |

OTHER PUBLICATIONS

Patent Abstracts of Japan, No. 4–52989, Feb. 20, 1992.

*Primary Examiner*—Scott Rogers
*Attorney, Agent, or Firm*—Staas & Halsey

[57] ABSTRACT

A feature extracting unit extracts an input feature vector from an input character pattern. A learning unit computes orthonormal bases of a partial eigenspace of an original feature space from learning feature vectors of a plurality of learning character patterns, and stores the computation results in an orthonormal base storage unit for the partial eigenspace. The learning unit computes each of the dictionary selection feature vectors prescribed in the partial eigenspace corresponding to each of the object character patterns, and stores the computation results in a recognition dictionary unit. A feature selection unit computes an input selection feature vector obtained by projecting an input selection feature vector extracted by the feature extracting unit on the partial eigenspace using the above described orthonormal bases. A collating unit estimates a type of the input character pattern by collating the above described input selection feature vector with each of the dictionary selection feature vectors.

16 Claims, 10 Drawing Sheets

FIG. 1
(PRIOR ART)

$$\begin{cases} d_{org} = |\underline{x}_2 - \underline{x}_1| \\ \quad = \{(\underline{a}_1^T\underline{x}_2 - \underline{a}_1^T\underline{x}_1)^2 + (\underline{a}_2^T\underline{x}_2 - \underline{a}_2^T\underline{x}_1)^2 + (\underline{a}_3^T\underline{x}_2 - \underline{a}_3^T\underline{x}_1)^2\}^{1/2} \\ d_{new} = \{(\underline{\phi}_1^T\underline{x}_2 - \underline{\phi}_1^T\underline{x}_1)^2 + (\underline{\phi}_2^T\underline{x}_2 - \underline{\phi}_2^T\underline{x}_1)^2\}^{1/2} \end{cases}$$

FIG. 2
(PRIOR ART)

$$\begin{cases} d_{org} = |\underline{x}_2 - \underline{x}_1| \\ \quad = \{(\underline{a}_1^T\underline{x}_2 - \underline{a}_1^T\underline{x}_1)^2 + (\underline{a}_2^T\underline{x}_2 - \underline{a}_2^T\underline{x}_1)^2 + (\underline{a}_3^T\underline{x}_2 - \underline{a}_3^T\underline{x}_1)^2\}^{1/2} \\ d_{new} = \{(\underline{\psi}_1^T\underline{x}_2 - \underline{\psi}_1^T\underline{x}_1)^2 + (\underline{\psi}_2^T\underline{x}_2 - \underline{\psi}_2^T\underline{x}_1)^2\}^{1/2} \end{cases}$$

APPARATUS AND METHOD OF RECOGNIZING PATTERN THROUGH FEATURE SELECTION BY PROJECTING FEATURE VECTOR ON PARTIAL EIGENSPACE

BACKGROUND OF THE INVENTION

1. Field of the Invention

The present invention relates to the technology of recognizing a pattern of characters, etc. by selecting features through efficiently reducing the number of dimensions of feature vectors indicating a pattern.

2. Description of the Related Art

Recently, document recognizing technology for electronically filing documents, efficiently following an office work flow, and encoding data as necessary, is earnestly demanded. Particularly, character recognizing technology, that is, an aspect of document recognizing technology, is essential for encoding character string information. In this technology, a method of quickly estimating the type of characters with the recognition precision maintained is required to put the character recognizing technology into practical use in various fields. The method of selecting features by reducing the number of dimensions of the character vectors of input characters using statistical technology is effective in reducing the amount of computation for collation with a recognition dictionary. Therefore, the character recognizing technology using the feature selection method functions as an important element when a practical document recognizing apparatus is produced. It is also essential for generating a device for recognizing various patterns other than characters.

Described first below is a common concept of character recognition with characters as an example of a pattern.

First, when a character pattern is input, its size is normalized.

Then, a rectangular character area obtained by the normalization is divided into plural blocks forming the rectangular character area. For example, a single rectangular character area is equally divided into 9 blocks in 3 rows by 3 columns or 36 blocks in 6 rows by 6 columns.

Next, picture elements indicating the contour of a character (contour picture elements) existing in each block are extracted. For each picture element, the direction of the contour containing the picture element is determined. The contour picture element is a picture element corresponding directly to a character area, or can be obtained by processing a character area in a fine-line process. The above described direction can be one of 8 directions (up, down, left, right, and 4 diagonal directions), or one of further detailed 36 directions. Then, the number of the contour picture elements is obtained for each direction in each block. As a result, a partial feature vector which has the number of dimensions equal to the number of directions and whose element value corresponds to the number of contour picture elements in the direction of the element can be obtained for each block. For each input character pattern, a feature vector comprising all elements of each partial feature vector corresponding to each block contained in a corresponding rectangular character area can be obtained.

If the feature vector for each of the thus obtained character patterns is classified into the types of object characters, then a cluster is formed for each character type by grouping feature vectors of character patterns of the same character type in a multiple-dimensional space having the number of dimensions corresponding to the number of elements of the feature vector. Based on this characteristic, the feature vector of a learning character pattern is classified, and an average feature vector representing the type of the character corresponding to each of the resultant clusters is computed from the feature vector contained in the cluster. The average feature vector is computed by calculating an average value for each element of a feature vector. The average feature vector for each character type is entered in a dictionary.

When a character is actually recognized, the feature vector of an input character pattern is computed, and then the distance between the feature vector and each of the average feature vectors entered in the dictionary is computed. Thus, the character type corresponding to the average feature vector indicating the shortest distance is estimated to be the type of the input character. The distance can be a euclidean distance or a city block distance.

When the distance is computed for the entire feature space, a length of time corresponding to the number of dimensions of the feature space is required. A well-know method of performing such computation at a high speed is to compute the distance after reducing the number of dimensions of the feature space (for example, reducing from 384 dimensions to 64 dimensions). The method of reducing the number of dimensions in a feature space is referred to as feature selection. A concrete method for the feature selection can be a canonical determination analysis or a major component analysis. It is certain from experiments that the recognition ratio is hardly reduced with only about one-eighth of the original number of dimensions through the feature selection. On the contrary, the recognition ratio can also be enhanced by reducing noisy feature vectors not desired in the feature selection.

Figure 1:
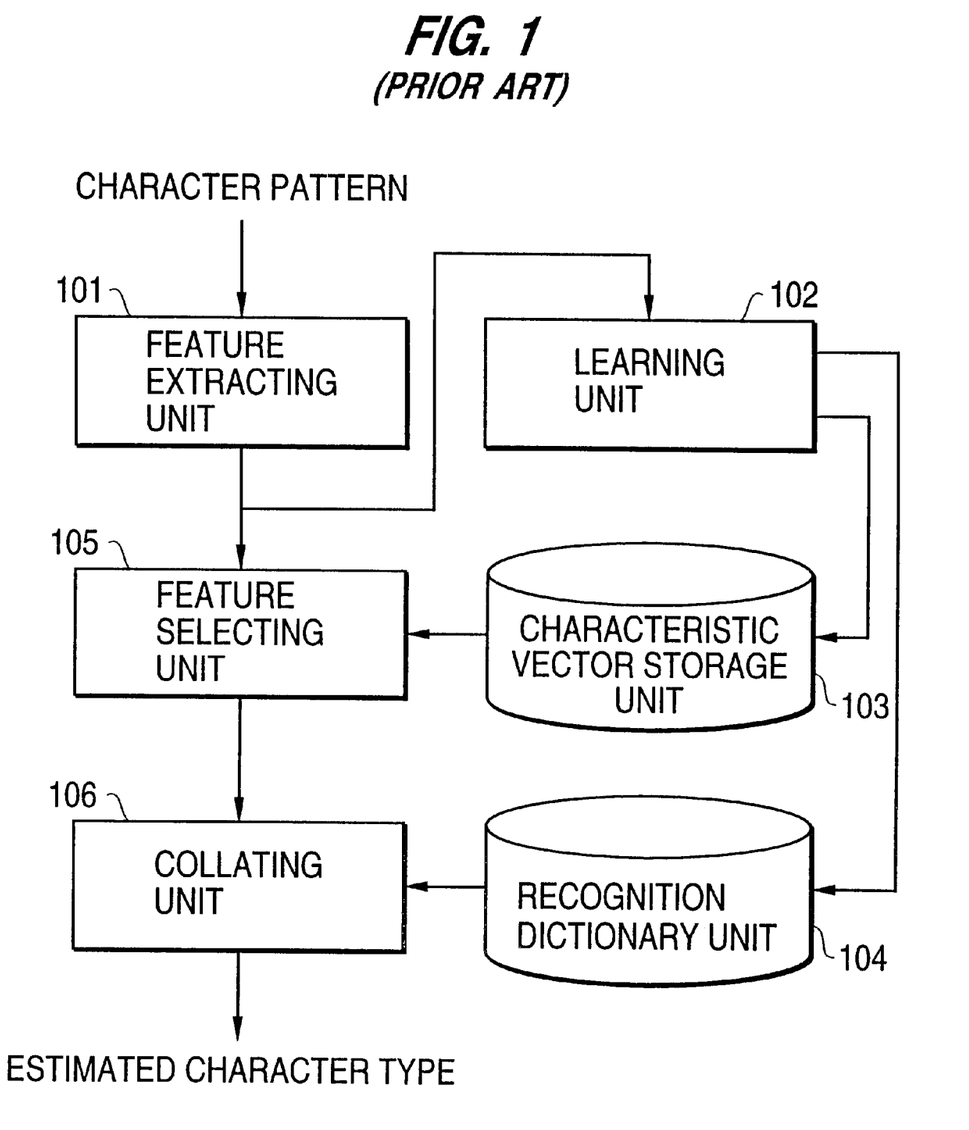
FIG. 1 shows the configuration of the conventional technology.

First, the conventional technology of recognizing a character through a canonical determination analysis for feature selection is described below by referring to the configuration shown in FIG. 1.

A feature extracting unit 101 extracts $n_i$ sets of learning feature vectors $\underline{x}_j^{(i)}$ ($1 \leq j \leq n_i$) represented by the following equation 1, as described above from $n_i$ samples of character patterns contained in each character type i ($1 \leq i \leq g$) of g types. The superscript '$T$' indicates the transposition of a matrix (or vector).

$$\underline{x}_j^{(i)} = (x_{jk}^{(i)}) = (x_{j1}^{(i)}, \ldots, x_{jN}^{(i)})^T \qquad (1)$$

The subscript k indicates the element number of a feature vector in the range of $1 \leq k \leq N$.

In the following description, an underlined symbol indicates the amount of a vector, and a symbol having an element number without an underline as described above indicates an element value of a vector.

A learning unit 102 computes an average feature vector $\underline{m}^{(i)}$ represented by the following equation 2, corresponding to each character type i ($1 \leq i \leq g$) of g types from the above described feature vector $\underline{x}_j^{(i)}$ ($1 \leq j \leq n_i$) corresponding to the character type i.

$$\underline{m}^{(i)} = (m_k^{(i)}) = (m_1^{(i)}, \ldots, m_N^{(i)})^T \qquad (2)$$

The learning unit 102 computes an average feature vector (entire average feature vector) $\underline{m}$ for all character types represented by the following equation 3 from the number $n_i$ of samples for each character type i and the above described average feature vector $\underline{m}^{(i)}$.

$$\underline{m}=(m_k)=(m_1, \ldots, m_N)^T \qquad (3)$$

Then, the learning unit 102 computes the inter-character-type variance matrix $S_b$ and the inner-character-type variance matrix $S_w$ based on the feature vector $\underline{x}_j^{(i)}$ for each character type i, number of samples $n_i$, the above described average feature vector $\underline{m}^{(i)}$, and the entire average feature vector $\underline{m}$ as indicated by the following equations 4 through 7. The subscripts p and q indicate element numbers of the feature vector in the range of $1 \leq p, q \leq N$.

$$S_b = (b_{pq}) \qquad (4)$$

$$b_{pq} = \sum_{i=1}^{g} n_i (m_p^{(i)} - m_p)(m_q^{(i)} - m_q) \qquad (5)$$

$$S_w = (W_{pq}) \qquad (6)$$

$$W_{pq} = \sum_{i=1}^{g} \sum_{j=1}^{ni} \left( X_{jp}^{(i)} - m_p^{(i)} \right)\left( X_{jp}^{(i)} - m_q^{(i)} \right) \qquad (7)$$

Furthermore, the learning unit 102 satisfies the following equation 8 using the above described inter-character-type variance matrix $S_b$ and inner-character-type variance matrix $S_w$, and computes N sets of characteristic vectors $\underline{\phi}_k$ (each dimension is N with a length of 1) and a set of eigenvalues $\lambda_k$ ($1 \leq k \leq N$).

$$S_b \underline{\phi}_k = \lambda_k S_w \underline{\phi}_k \ (1 \leq k \leq N) \ \lambda_1 \geq \lambda_2 \geq \ldots \geq \lambda_N \qquad (8)$$

Next, the learning unit 102 selects larger M (M<N) characteristic vectors $\underline{\phi}_h$ ($1 \leq h \leq M$) from among the eigenvalues $\lambda_k$ corresponding to the computed N characteristic vectors $\underline{\phi}_k$, and stores them in a characteristic vector storage unit 103.

The learning unit 102 computes an M-dimensional average selection feature vector $\underline{m}^{(i)'}$ for each character type i by computing the inner product of the above described M characteristic vectors $\underline{\phi}_h$ ($1 \leq h \leq M$) and the N-dimensional average feature vector $\underline{m}^{(i)}$ for each character type i as represented by the following equation 9. Then, it stores them in a recognition dictionary unit 104.

$$\underline{m}^{(i)'}=(m_h^{(i)'})=(\underline{\phi}_1^T \underline{m}^{(i)}, \underline{\phi}_2^T \underline{m}^{(i)}, \ldots, \underline{\phi}_M^T \underline{m}^{(i)}) \qquad (9)$$

where the subscript h indicates an element number of a selection feature vector in the range of $1 \leq h \leq M$. Thus, a feature selection process is performed by reducing N dimensions into M dimensions for an average feature vector for each character type stored in the dictionary. This feature selection process is equal to the process of projecting an N-dimensional average feature vector on M coordinate axes defined with M characteristic vectors $\underline{\phi}_h$ so that the inter-character-type variance can be expanded and the inner-character-type variance can be reduced, that is, so that different types of characters can be separated and the same type of characters can be collected in a space after the feature selection prescribed by M characteristic vectors $\underline{\phi}_h$. That is, in the canonical determination analysis, all clusters in the original feature space corresponding to all object character types are converted into a new space.

When a character is actually recognized, the feature extracting unit 101 extracts the N-dimensional feature vector $\underline{x}$ represented by the following equation 10 from an input character pattern whose character type is unknown.

$$\underline{x}=(x_k)=(x_1, \ldots, x_N)^T \qquad (10)$$

where the subscript k indicates the element number of the feature vector before the feature selection in the range of $1 \leq k \leq N$.

A feature selecting unit 105 computes the M-dimensional selection feature vector $\underline{y}$ by computing the inner product of M characteristic vectors $\underline{\phi}_h$ ($1 \leq h \leq M$) and the N-dimensional feature vector $\underline{x}$ stored by the characteristic vector storage unit 103 by the following equation 11.

$$\underline{y}=(y_h)=(\underline{\phi}_1^T \underline{x}, \underline{\phi}_2^T \underline{x}, \ldots, \underline{\phi}_M^T \underline{x}) \qquad (11)$$

Thus, the feature selection process is performed by reducing N dimensions into M dimensions for an input feature vector.

Finally, a collating unit 106 computes, for each character type i, each euclidean distance $d^{(i)}$ between the M-dimensional selection feature vector $\underline{y}$ and each average selection feature vector $\underline{m}^{(i)'}$ stored by the recognition dictionary 104 using the following equation 12.

$$d^{(i)} = \left\{ \sum_{h=1}^{M} \left( y_h - m_h^{(i)'} \right)^2 \right\}^{1/2} \qquad (12)$$

Then, the collating unit 106 outputs the character type i corresponding to the average selection feature vector $\underline{m}^{(i)'}$ having the shortest distance $d^{(i)}$ as an estimated character type.

According to the above described conventional technology using the canonical determination analysis as feature selection, the number of elements used in computing the distance is reduced from N terms to M terms. Therefore, the recognition speed can be greatly increased by setting M approximately to one-eighth of N.

However, according to the conventional technology using the canonical determination analysis as feature selection, it is not guaranteed that M characteristic vectors $\underline{\phi}_h$ ($1 \leq h \leq M$) are orthogonal to one another. Therefore, if a new feature space is defined based on these characteristic vectors $\underline{\phi}_h$, the feature vector $\underline{x}$ of an object character is projected on M coordinate axes corresponding to the above described M characteristic vectors $\underline{\phi}_h$, and if the euclidean distance between the projection result, that is, the selection feature vector $\underline{y}$, and an average selection feature vector $\underline{m}^{(i)'}$ for each character type i is calculated, then the distance may be considerably different from the distance in the original N-dimensional feature space.

Figure 2:
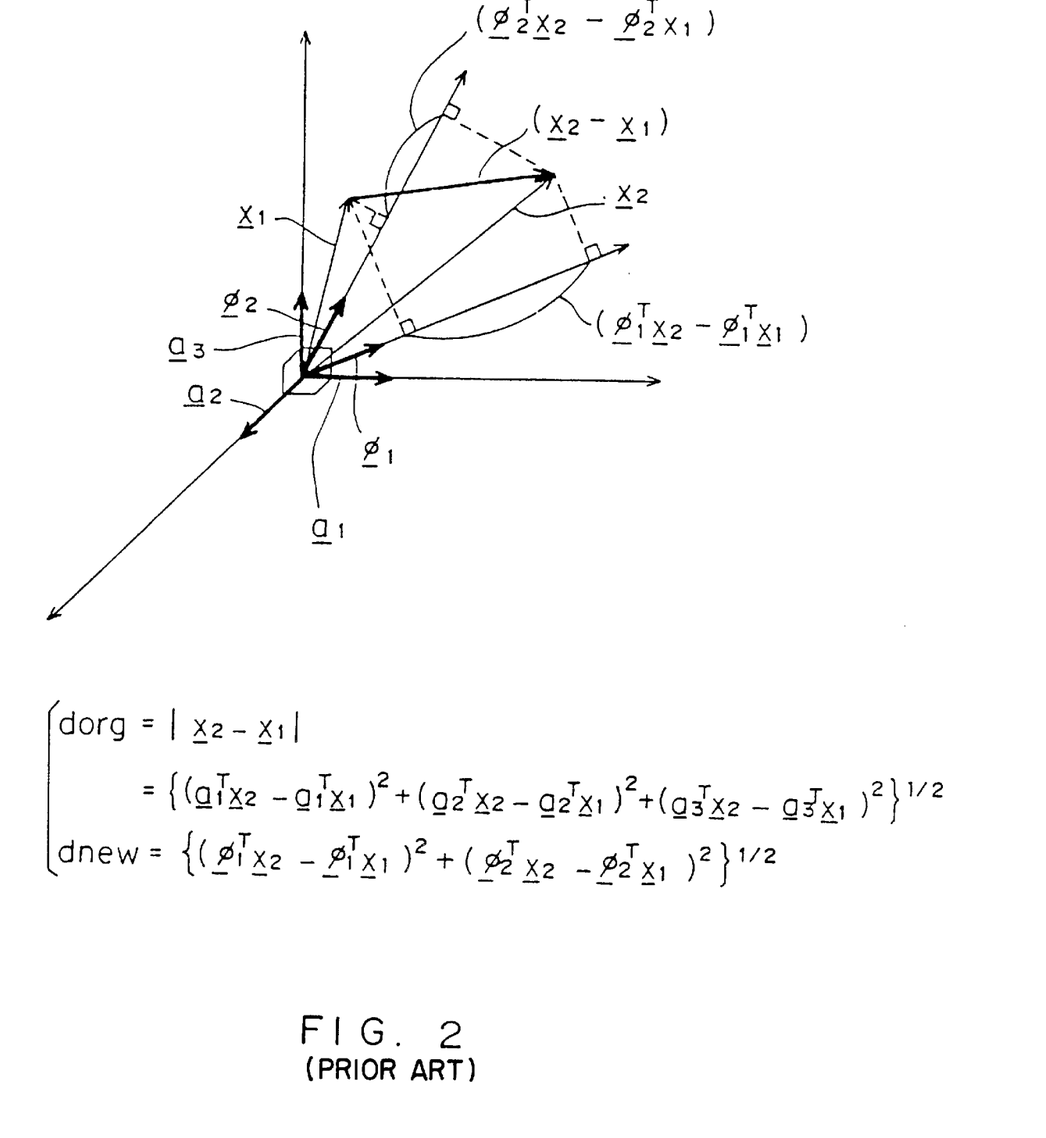
FIG. 2 shows a problem of the conventional technology.

For comprehensibility, assume that the number of dimensions before feature selection is 3 and the number of dimensions after the feature selection is 2 as shown in FIG. 2.

The euclidean distance $d_{org}$ between the feature vector $\underline{x}_2$ and the feature vector $\underline{x}_1$ in the 3-dimensional feature space before the feature selection is obtained by the following equation 13.

$$d_{org}=\|\underline{x}_2-\underline{x}_1\| \ \{(\underline{a}_1^T\underline{x}_2-\underline{a}_1^T\underline{x}_1)^2+(\underline{a}_2^T\underline{x}_2-\underline{a}_2^T\underline{x}_1)^2+(\underline{a}_3^T\underline{x}_2-\underline{a}_3^T\underline{x}_1)^2\}^{1/2} \qquad (13)$$

The approximate euclidean distance $d_{new}$ between the feature vector $\underline{x}_2$ and the feature vector $\underline{x}_1$ in the 2-dimensional feature space after the feature selection is obtained by the following equation 14.

$$d_{new} = \{(\phi_1^T \underline{x}_2 - \phi_1^T \underline{x}_1)^2 + (\phi_2^T \underline{x}_2 - \phi_2^T \underline{x}_1)^2\}^{1/2} \quad (14)$$

In equation 14 above, the physical quantity in each term on the right-hand side is shown in FIG. 2. As shown in FIG. 2, equation 14 is not based on the Pythagorean theorem. The euclidean distance $d_{new}$ in the 2-dimensional feature space after the feature selection is quite different from the euclidean distance $d_{org}$ in the 3-dimensional feature space before the feature selection.

According to the conventional technology using the canonical determination analysis as feature selection, the combination of the projection of the feature vector $\underline{x}$ with M characteristic vectors $\underline{\phi}_h$ ($1 \leq h \leq M$) obtained by the canonical determination analysis does not refer to the projection of the feature vector $\underline{x}$ on the partial eigenspace for the original feature space, and thereby a degradation in precision occurs in recognizing a character. Therefore, it is very hard to realize a character recognizing apparatus, etc. having practical recognition precision.

Using the main component analysis, that is, another method for feature selection, a set of main component vectors with which each character type is separate from each other is computed for each character type (a set of main component vectors for each character type). This analysis method is used, not to classify characters for the purpose of determining plural types of characters, but to obtain a correct recognition result by projecting a feature vector of an object character to the main component vector corresponding to each character type when similar character types exist in areas close to each other in a feature space. That is, in the main component analysis, a new individual space indicating a main component vector as a coordinate axis for each character type is generated. Since the distance between an object character and each character type is computed after the feature vector of the object character is projected on the main component vector of each character type, a large amount of computation is required when a large number of character types are involved. Therefore, the analysis method is used mainly to, for example, determine characters such as numerical characters, characters of a small number of types, etc.

The definition of the distance for the feature vector relates to a Mahalanobis distance and a Bayes distance. When a recognizing apparatus is designed using these distances, the distance is computed after placing limitations in such a way that the coordinate axes for use in computing the distance may be orthogonal to each other. Therefore, the problems with the canonical determination analysis do not arise with this method, but there is the problem that the computation is complicated and a large amount of computation is required.

The above described problems are not necessarily related only to a character recognizing unit, but are common to the technology for recognizing various patterns such as image patterns, voice patterns, etc. through feature vectors.

SUMMARY OF THE INVENTION

The present invention has been developed based on the above described background, and aims at realizing a pattern recognizing apparatus capable of maintaining the recognition precision while performing a recognizing process at a high speed by reducing the number of dimensions of the feature vector by a feature selection method, in order to recognize various patterns.

The first aspect of the present invention is based on a pattern recognizing apparatus for recognizing an input pattern using an input feature vector representing the features of the input pattern such as an input character pattern, etc.

First, the present invention comprises an input feature vector extracting unit for extracting an input feature vector representing the features of the input pattern.

It also comprises an orthonormal base storage unit for holding orthonormal bases of a partial eigenspace of an original feature space.

It also comprises a recognition dictionary unit for storing each dictionary selection feature vector prescribed in the partial eigenspace corresponding to one or more object patterns.

It further comprises a feature selecting unit for computing an input selection feature vector projected on a partial eigenspace of an input feature vector extracted by the input feature vector extracting unit using the orthonormal bases stored by the orthonormal base storage unit.

It also comprises a collating unit for recognizing the type of an input pattern corresponding to the input selection feature vector by collating the input selection feature vector computed by the character selecting unit with each dictionary selection feature vector stored in the recognition dictionary unit. The collation is made by, for example, computing the distance between the input selection feature vector with each dictionary selection feature vector and comparing the resultant distance values with each other. The distance can be, for example, the distance based on a euclidean distance, city block distance, chess board distance, etc.

The second aspect of the present invention is based on the pattern learning apparatus for computing the orthonormal bases and each dictionary selection feature vector obtained by the pattern recognizing apparatus according to the first aspect of the present invention.

First, the present invention comprises a learning feature vector extracting unit for extracting each of the learning feature vectors representing the features of learning patterns.

It also comprises a orthonormal base computing unit for computing orthonormal bases of a partial eigenspace according to the learning feature vectors extracted by the learning feature vector extracting unit.

It also comprises a dictionary feature vector computing unit for computing each dictionary feature vector prescribed in the original feature space corresponding to each object pattern based on the learning feature vectors extracted by the learning feature vector extracting unit.

It further comprises a dictionary selection feature vector computing unit for computing each dictionary selection feature vector projected on a partial eigenspace of each dictionary feature vector computed by the dictionary feature vector computing unit using the orthonormal bases computed by the orthonormal base computing unit.

With the configurations according to the first or second aspect of the present invention, the orthonormal bases can be computed by, for example, computing a predetermined number of characteristic vectors smaller than the number of dimensions of the original feature space in order from the one having the largest eigenvalue after performing a canonical determination analysis on the learning feature vectors of learning patterns, and by sequentially orthogonalizing the predetermined number of characteristic vectors in order from the one having the largest eigenvalue.

With the configurations according to the first or second aspect of the present invention, the input selection feature vector or dictionary selection feature vector obtained by projecting the input feature vector or dictionary feature vector on the partial eigenspace can be configured as if it were obtained by projecting the input feature vector or dictionary feature vector on the orthonormal base vectors. Furthermore, the input selection feature vector or each dictionary selection feature vector obtained as a result of the projection can be configured as if it were obtained as a result of computing the inner product of either the input feature vector or the dictionary feature vector and each orthonormal base vector.

With the above described first or second aspect of the present invention, the dictionary selection feature vector can be configured as if it were based on the average feature vector obtained as an average vector of the feature vector for each type of object pattern.

The present invention can be configured to have the functions according to the above described first or second aspect of the present invention.

The present invention can also be configured as a computer-readable storage medium used to direct the computer to perform the functions according to the above described first or second aspect of the present invention.

As indicated by the above described configuration, the present invention realizes high-speed recognition by reducing the number of elements in distance computation as in the conventional technology. Furthermore, the unique feature of the present invention is to store a distance by projecting a feature vector on the partial eigenspace of an original feature space, thereby realizing a character recognizing apparatus with practical recognition precision.

In this case, orthonormal bases can be computed in a simple process by computing orthonormal base vectors using a simple recurrence equation for orthogonalization after computing the characteristic vectors in a conventional canonical determination analysis, etc.

It is anticipated that the features of the canonical determination analysis in that the inner-character-type variance can be minimized while the inter-character-type variance can be maximized, might be lost to some extent by orthogonalizing the above described characteristic vectors. However, from experiments, the resultant reduction in the recognition ratio can be sufficiently compensated for by the improvement in the recognition ratio attained by normalization through the orthonalization of the distance computation, thereby definitely implying the significance of the present invention.

BRIEF DESCRIPTION OF THE DRAWINGS

Other objects and features of the present invention are easily comprehensible to one of ordinary skill in the art by referring to the attached drawings and the descriptions of the preferred embodiment of the present invention.

DESCRIPTION OF THE PREFERRED EMBODIMENTS

The preferred embodiments of the present invention are sequentially described by referring to the attached drawings.

According to the preferred embodiments of the present invention, after M characteristic vectors $\phi_h$ ($1 \leq h \leq M$) are computed in order from the one having the largest eigenvalue according to the canonical determination analysis, M orthonormal base vectors $\psi_h$ ($1 \leq h \leq M$) are computed by orthogonalizing the characteristic vectors $\phi_h$ using the Schmidt orthogonalization method. Then, the selection feature vector is computed by projecting the N-dimensional feature vector on the above described M orthonormal base vectors $\psi_h$. A recognizing process is performed using the selection feature vector, and the number of dimensions of the feature vector is reduced by the feature selection method. Thus, the recognizing process can be performed at a high speed and a high recognition precision can be maintained according to the present invention.

Figure 4:
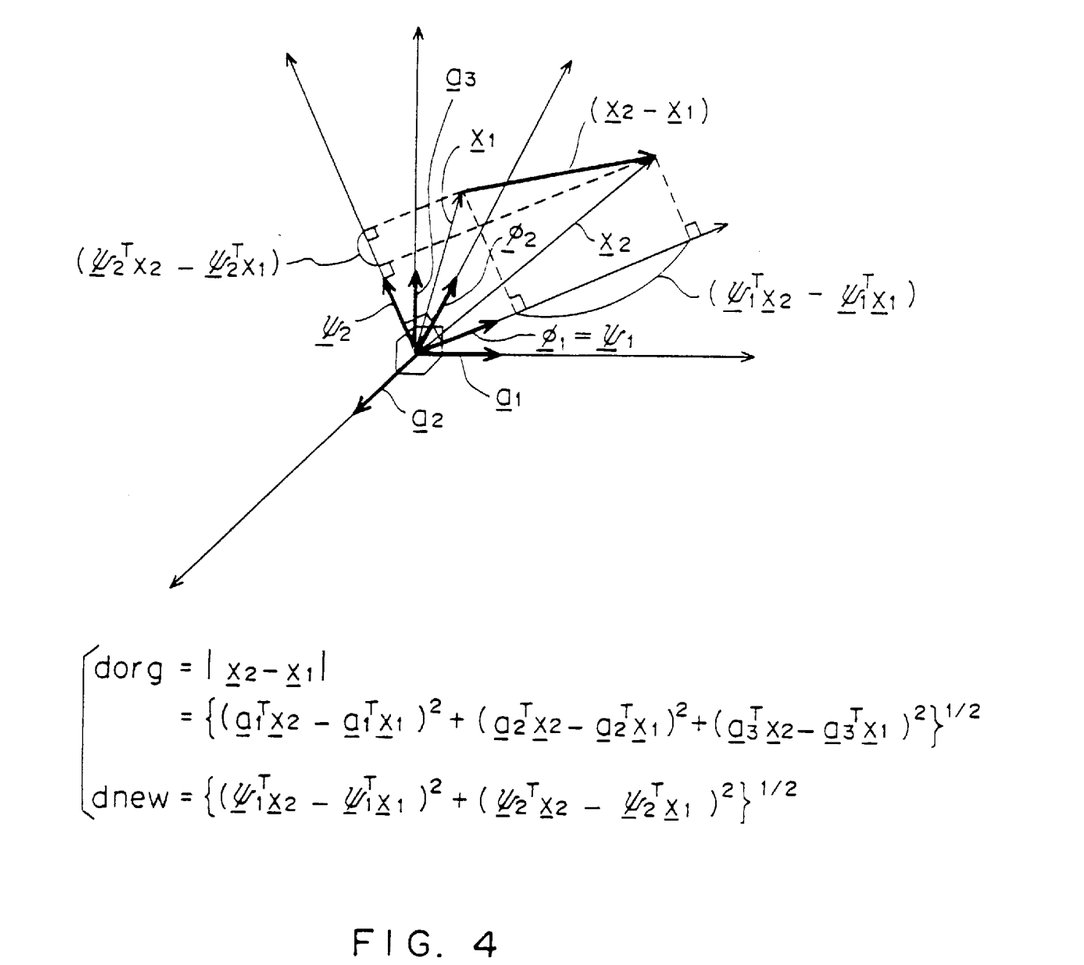
FIG. 4 shows the principle of the preferred embodiment of the present invention.

For comprehensibility, assume that the number of dimensions before feature selection is 3 and the number of dimensions after the feature selection is 2 as shown in FIG. 4.

First, after two characteristic vectors $\phi_1$ and $\phi_2$ are computed in order from the one having the largest eigenvalue according to the canonical determination analysis, two orthonormal base vectors $\psi_1$ ($=\phi_1$) and $\psi_2$ are computed by orthogonalizing the characteristic vectors using the Schmidt orthogonalization method. The euclidean distance $d_{org}$ from the feature vector $\underline{x}_2$ to the feature vector $\underline{x}_1$ in the 3-dimensional feature space before the feature selection is obtained by the above described equation 13.

The approximate euclidean distance $d_{new}$ from the feature vector $\underline{x}_2$ to the feature vector $\underline{x}_1$ in the 2-dimensional feature space after the feature selection is obtained by the following equation 15.

$$d_{new} = \{(\phi_1^T \underline{x}_2 - \phi_1^T \underline{x}_1)^2 + (\phi_2^T \underline{x}_2 - \phi_2^T \underline{x}_1)^2\}^{1/2} \tag{15}$$

In the above described equation 15, the physical amount in each term in the right-hand side is as shown in FIG. 4. As clearly shown in FIG. 4, equation 15 is based on the Pythagorean theorem, and the euclidean distance $d_{new}$ in the 2-dimensional feature space after the feature selection approximates to the euclidean distance $d_{org}$ in the 3-dimensional feature space before the feature selection.

The above described principle is applicable to the case where the number of dimensions is large. In the preferred embodiment practically described as follows, the combination of each projection of the feature vector $\underline{x}$ on the orthonormal base vectors $\psi_h$ is equivalent to the projection of the feature vector $\underline{x}$ on the partial eigenspace for the original feature space. As a result, sufficient character recognition precision can be guaranteed even after the feature selection.

Figure 3:
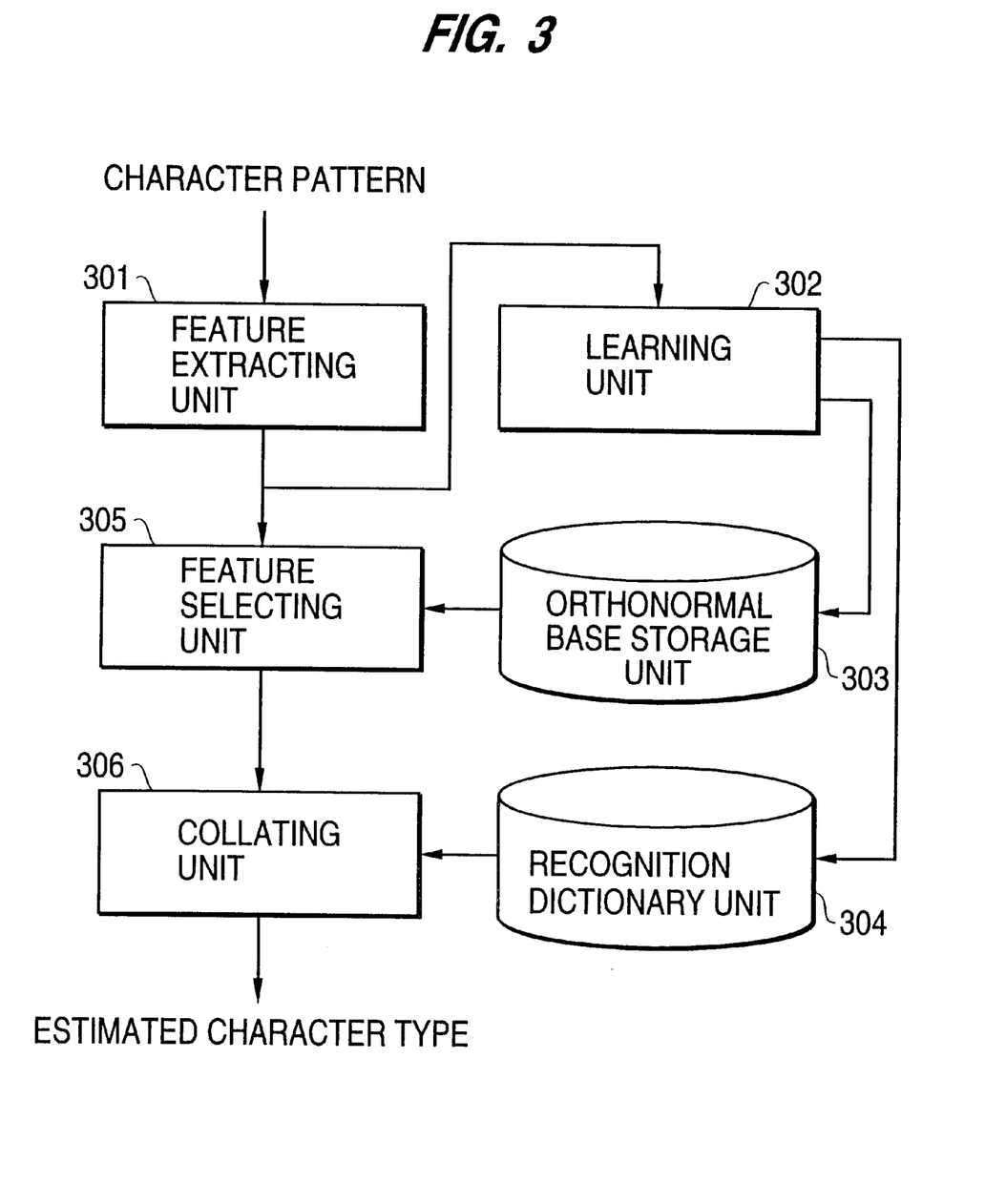
FIG. 3 shows the configuration according to the preferred embodiment.

FIG. 3 shows the configuration of the preferred embodiment according to the above described principle.

Figure 5:
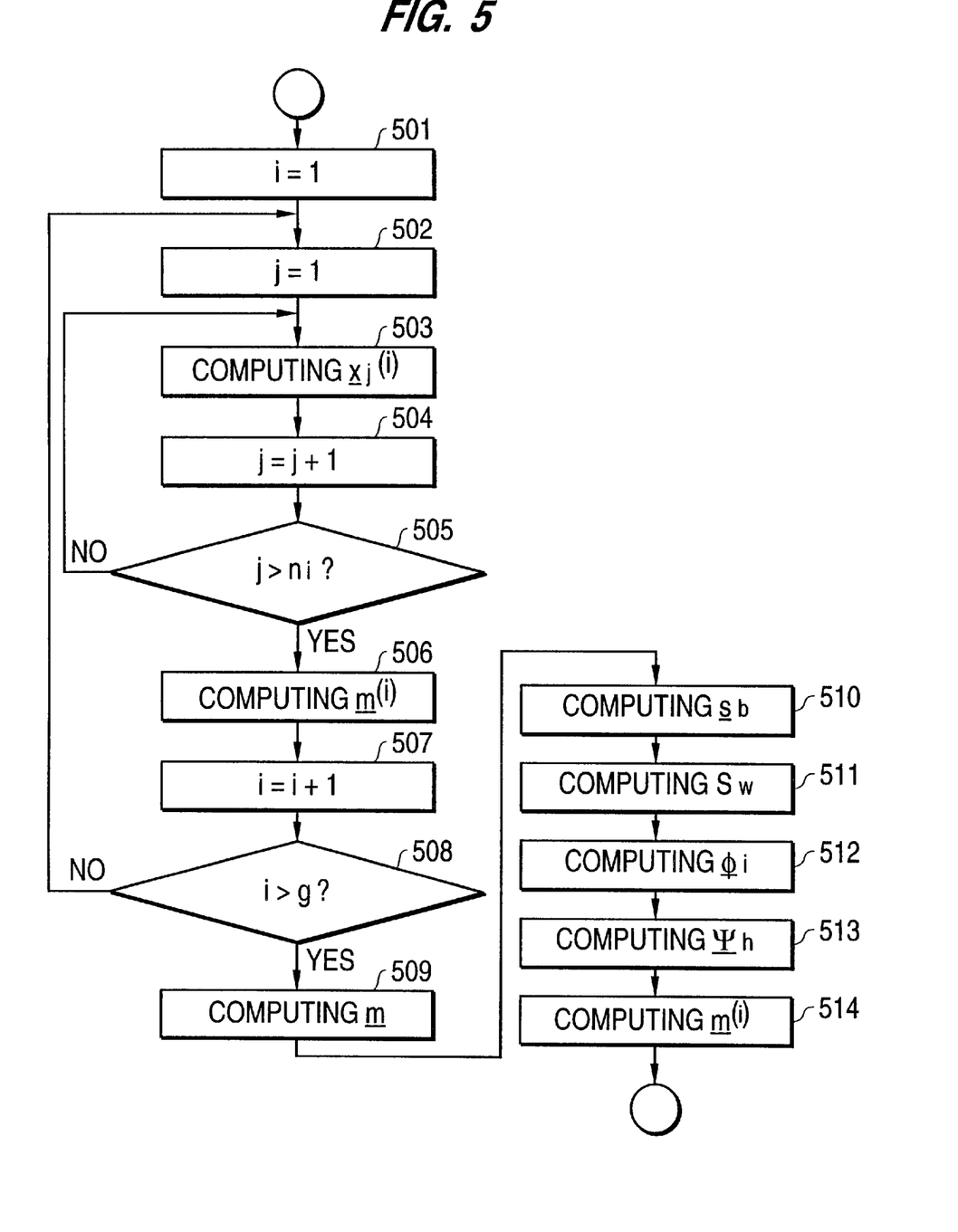
FIG. 5 is a flowchart showing the operation of the learning process in the preferred embodiment of the present invention.

First, in the learning process, a feature extracting unit 301 and a learning unit 302 perform the learning process represented by the flowchart shown in FIG. 5.

The feature extracting unit 301 extracts $n_i$ sets of learning feature vectors $\underline{x}_j^{(i)}$ ($1 \leq j \leq n_i$) indicated by the above described equation 1 from $n_i$ samples of character patterns contained in each character type i in step 503. After the sample number j is set to 1 in step 502, the process in step 503 is repeatedly performed with the sample number j incremented by 1 in step 504 until it is determined in step 505 that the sample number j has exceeded the number of samples $n_i$ of the character type i. Thus, $n_i$ sets of learning feature vectors $\underline{x}_j^{(i)}$ are extracted for the character type i.

Next, the learning unit 302 computes, for one character type i, the average feature vector $\underline{m}^{(i)}$ represented by equation 2 corresponding to the character type i by computing the average value of the vector elements for each element position of the vector using $n_i$ sets of learning feature vectors $\underline{x}_j^{(i)}$ corresponding to the character type i obtained in the above described steps 502 through 505.

After the character type number i is set to 1 in step 501, the processes in steps 502 through 506 are performed with the character type number i incremented by 1 in step 507 until it is determined in step 508 that the character type number i has exceeded the total number g of character types. Thus, computing processes are sequentially performed on $n_i$ sets of learning feature vectors $\underline{x}_j^{(i)}$ and one average feature vector $\underline{m}^{(i)}$ for g variations of character type i ($1 \leq i \leq g$).

Then, in step 509, the learning unit 302 computes each element $m_k$ of the average feature vector (total average feature vector) $\underline{m}$ of all character types shown by the above described equation 3 from the number $n_i$ of samples for each character type i and each element $m_k^{(i)}$ of the above described average feature vector $\underline{m}$ as shown by the following equation 16.

$$m_k = \left( \sum_{i=1}^{g} m_k^{(i)} \cdot n_i \right) / \sum_{i=1}^{g} n_i \quad (16)$$

Figure 6:
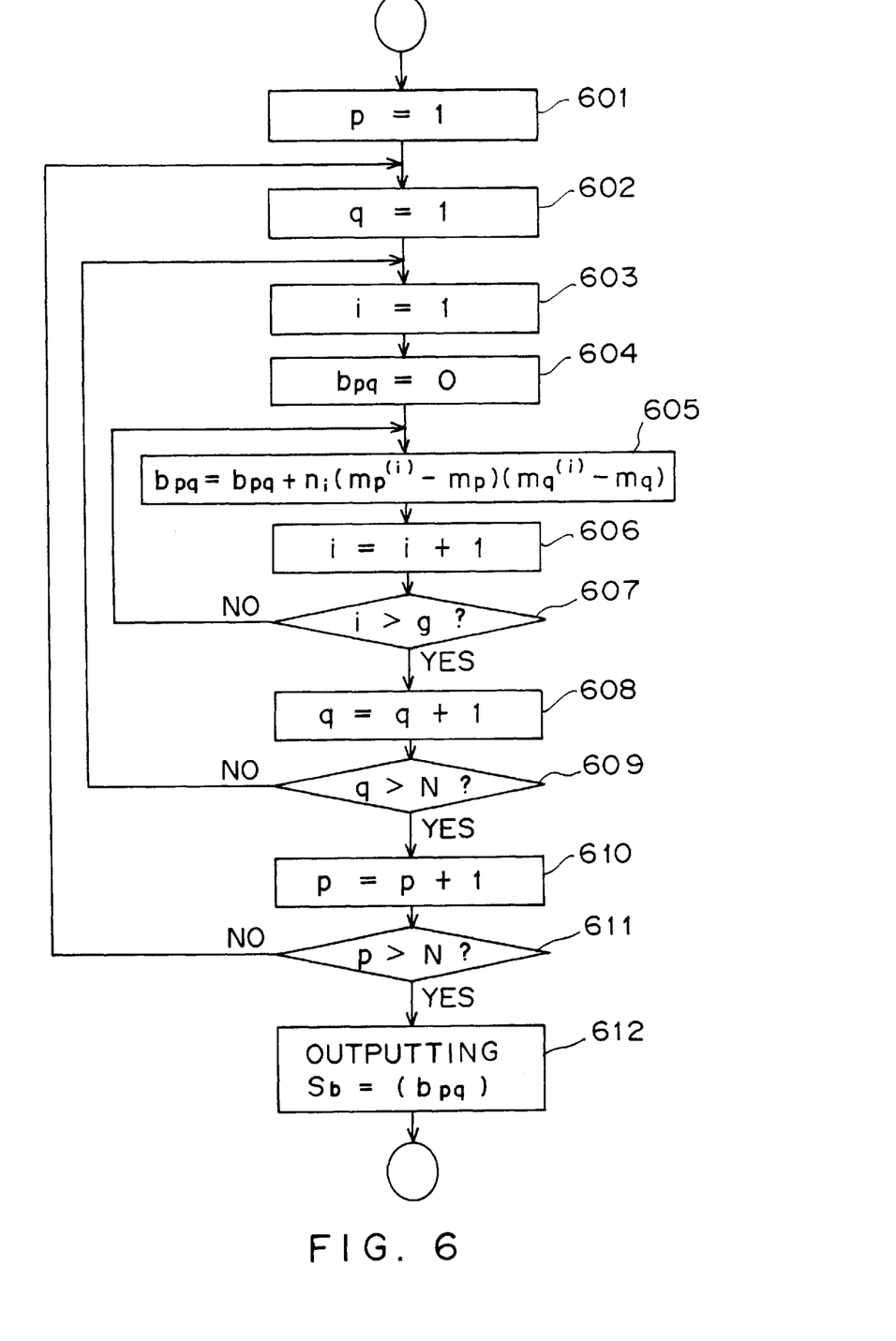
FIG. 6 is a flowchart showing the process of computing an inter-character-type variance matrix $S_b$.

In step 510, the learning unit 302 computes the inter-character-type variance matrix $S_b$ based on the feature vector $\underline{x}_j^{(i)}$ for each character type i, number $n_i$ of samples, average feature vector $\underline{m}^{(i)}$, and total average feature vector $\underline{m}$. The flowchart in FIG. 6 shows the details of this process.

After the first element number p is set to 1 in step 601, it is incremented by 1 in step 610 until it is determined in step 611 that the element number p has exceeded the number N. After the second element number q is set to 1 in step 602, it is incremented by 1 in step 608 until it is determined in step 609 that the element number q has exceeded the number N. The computation is performed by the above described equation 5 in steps 603 through 607 for each set of the first element number p and second element number q determined by these control loops.

That is, in step 604, an element value $b_{pq}$ contained in the inter-character-type variance matrix $S_b$ determined by the first element number p and second element number q is cleared, and the character type number i is incremented by 1 in step 606 until it is determined in step 607 that the character type number i has exceeded the total number g of character types, after it was set to 1 in step 603. Then, in step 605, the element value $b_{pq}$ is obtained by repeatedly performing the computation using the following equation 17.

$$b_{pq} = b_{pq} + n_i (m_p^{(i)} - m_p)(m_q^{(i)} - m_q) \quad (17)$$

All element values $b_{pq}$ contained in the inter-character-type variance matrix $S_b$ are determined by the combination of the first element number p and second element number q, by repeatedly performing the processes in steps in 603 through 607 using the control loop in steps 601, 602, and 608 through 611.

Then, in step 612, the inter-character-type variance matrix $S_b$ is output as a set of all element values $b_{pq}$ computed as described above by equation 4.

Figure 7:
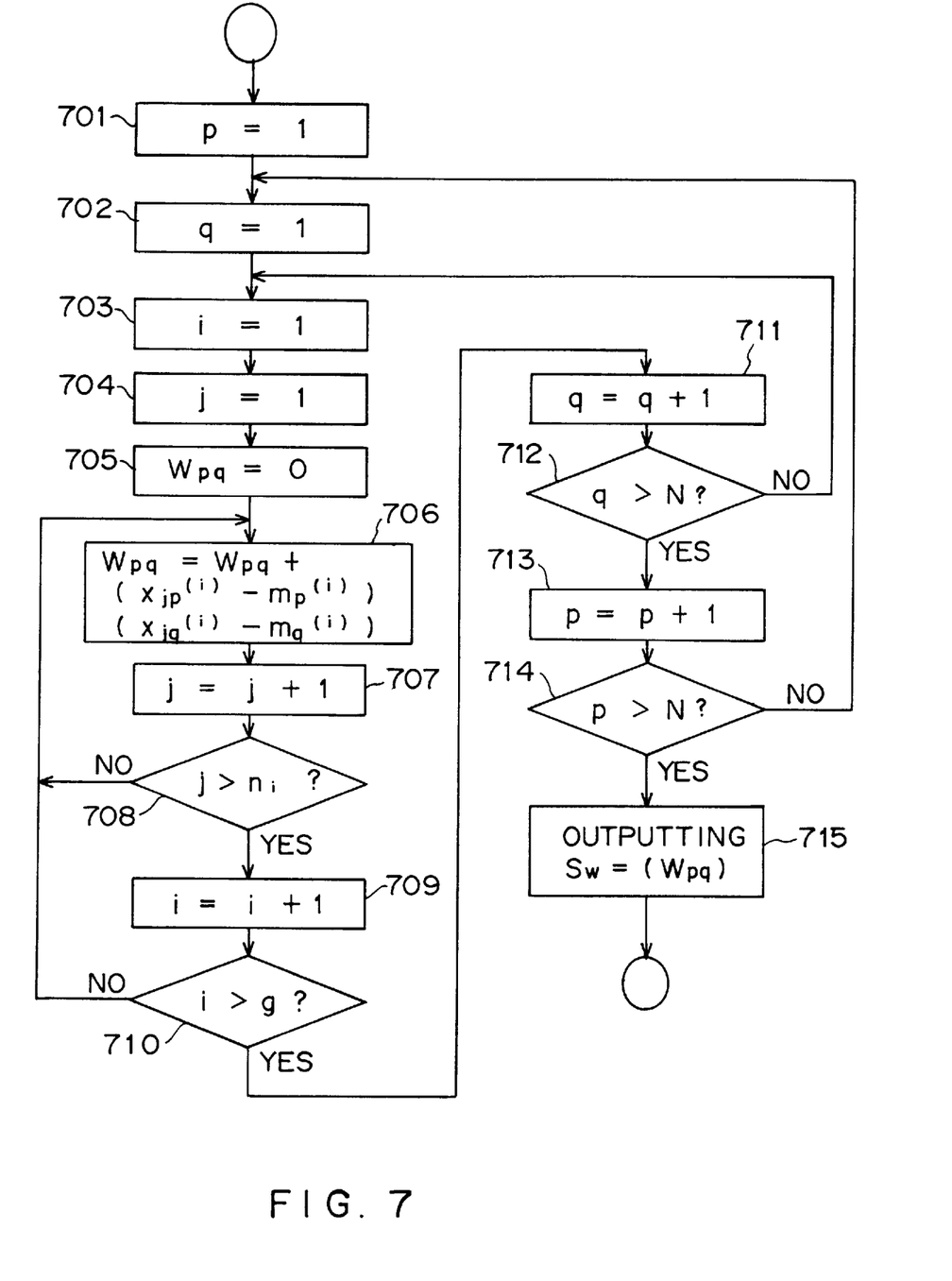
FIG. 7 is a flowchart showing the process of computing an inner-character-type variance matrix $S_w$.

The learning unit 302 obtains the inter-character-type variance matrix $S_b$ in step 510 shown in FIG. 5, and computes the inner-character-type variance matrix $S_w$ in step 511 based on the feature vector $\underline{x}_j^{(i)}$, number $n_i$ of samples, and average feature vector $\underline{m}^{(i)}$. FIG. 7 is a flowchart showing in detail these processes.

The first element number p is set to 1 in step 701, and then incremented by 1 in step 713 until it is determined in step 714 that the first element number p has exceeded the number N. The second element number q is set to 1 in step 702, and then incremented by 1 in step 711 until it is determined in step 712 that the second element number q has exceeded the number N. The computing process is performed by the above described equation 7 in steps 703 through 710 on each set of the first element number p and second element number q determined through the control loop.

That is, in step 705, an element value $w_{pq}$ contained in the inner-character-type variance matrix $S_w$ determined by the first element number p and second element number q is cleared, and the character type number i is incremented by 1 in step 709 until it is determined in step 710 that the character type number i has exceeded the total number g of character types, after it was set to 1 in step 703. Then, the loop in steps 706 through 708 is repeatedly executed. Furthermore, in this loop, the sample number j is set to 1 in step 704, and is incremented by 1 in step 707 until it is determined in step 708 that the sample number j has exceeded a total number $n_i$ of samples. Then, in step 706, the element value $W_{pq}$ is obtained by repeatedly performing the computing process by the following equation 18.

$$w_{pq} = w_{pq} + (x_{jp}^{(i)} - m_p^{(i)})(x_{jq}^{(i)} - m_q^{(i)}) \quad (18)$$

All element values $w_{pq}$ contained in the inner-character-type variance matrix $S_w$ are determined by the combination of the first element number p and second element number q, by repeatedly performing the processes in steps in 703 through 710 using the control loop of steps 701, 702, and 711 through 714.

Then, in step 715, the inner-character-type variance matrix $S_w$ is output as a set of all element values $w_{pq}$ computed as described above by equation 6.

The learning unit 302 satisfies the above described equation 8 in step 512 using the inter-character-type variance matrix $S_b$ computed in step 510 shown in FIG. 5, and the inner-character-type variance matrix $S_w$ computed in step 511, and then performs the computing process on N sets of characteristic vectors $\phi_k$ and eigenvalues $\lambda_k$ ($1 \leq k \leq N$). Since this computing process is well-known, the detailed explanation is omitted here. The learning unit 302 selects M (M<N) characteristic vectors $\phi_h$ ($1 \leq h \leq M$) having larger eigenvalues $\lambda_k$ from N character vectors $\phi_k$ in step 512.

Figure 9:
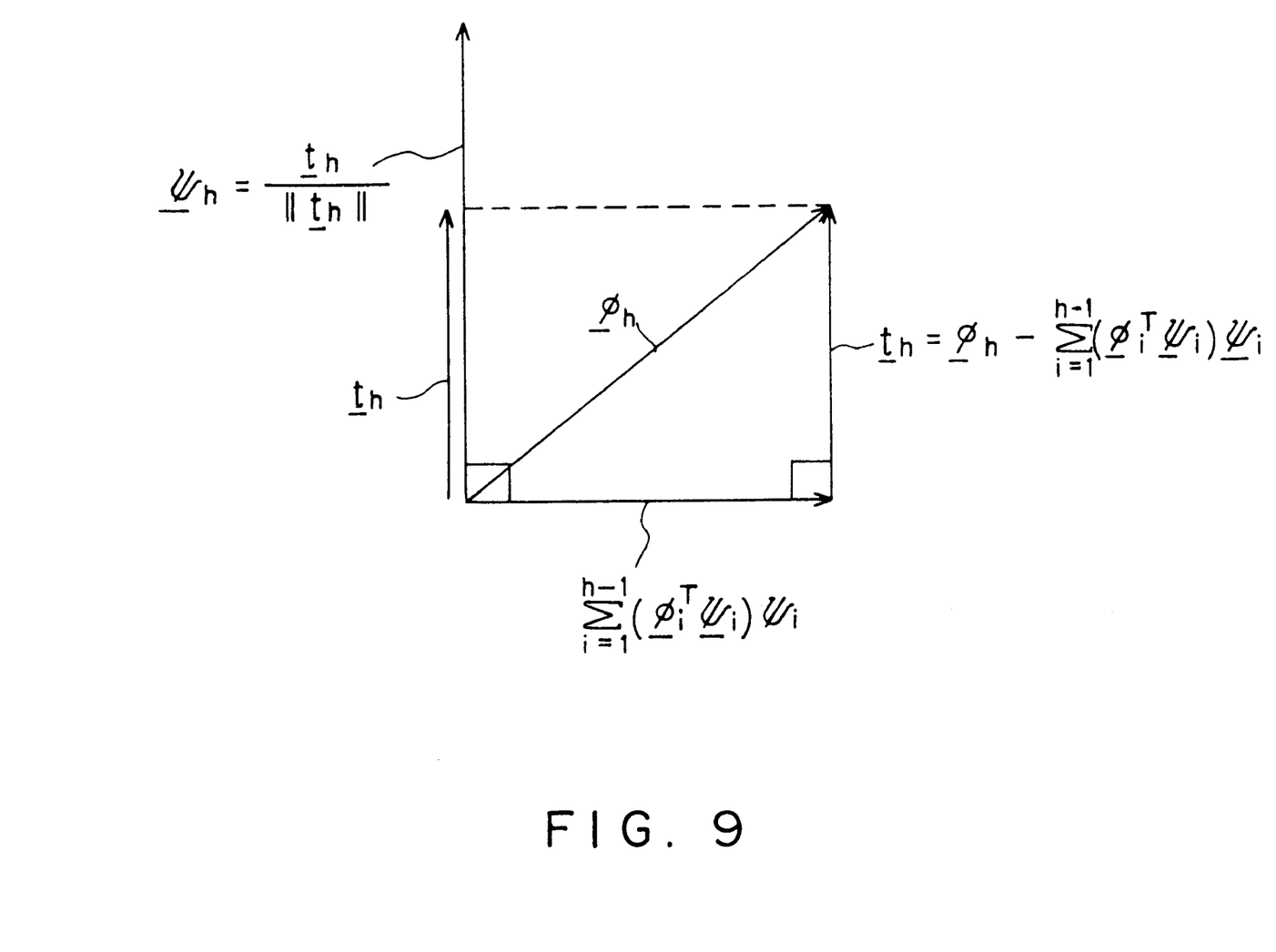
FIG. 9 shows the process of computing $\psi_h$.

In step 513, the learning unit 302 computes M orthonormal base vectors $\psi_h$ ($1 \leq h \leq M$) by orthogonalizing the above described characteristic vectors $\phi_h$ ($1 \leq h \leq M$). The orthogonalizing method can be the Schmidt orthogonalization method. In this orthogonalization, M orthonormal base vectors $\psi_h$ ($1 \leq h \leq M$) are sequentially computed in order from the characteristic vectors $\phi_h$ having larger eigenvalues $\lambda_h$ by executing the recurrence equation represented by the following equations 19 and 20 and the normalization equation represented by equation 21.

$$\underline{\phi}_1 = \underline{\phi}_1 \tag{19}$$

$$\underline{t}_h = \underline{\phi}_h - \sum_{i=1}^{h-1} (\underline{\phi}_i^T \underline{\phi}_i) \underline{\phi}_i \quad (2 \leq h \leq M) \tag{20}$$

$$\underline{\phi}_h = \underline{t}_h / \|\underline{t}_h\| \tag{21}$$

where, as shown in equation 20 and FIG. 9, a vector $\underline{t}_h$ which is orthogonal to all orthonormal base vectors $\underline{\psi}_i$ ($1 \leq i \leq h-1$) currently obtained based on the characteristic vector $\underline{\phi}_i$ ($1 \leq i \leq h-1$) having an eigenvalue larger than the currently processed characteristic vector $\underline{\phi}_h$ and which corresponds to the characteristic vector $\underline{\phi}_h$ in order sequentially from a characteristic vector having a larger eigenvalue. Then, the orthonormal base vector $\underline{\psi}_h$ corresponding to the characteristic vector $\underline{\phi}_h$ is computed by normalizing the length of the vector $\underline{t}_h$ to 1 by equation 21.

Figure 8:
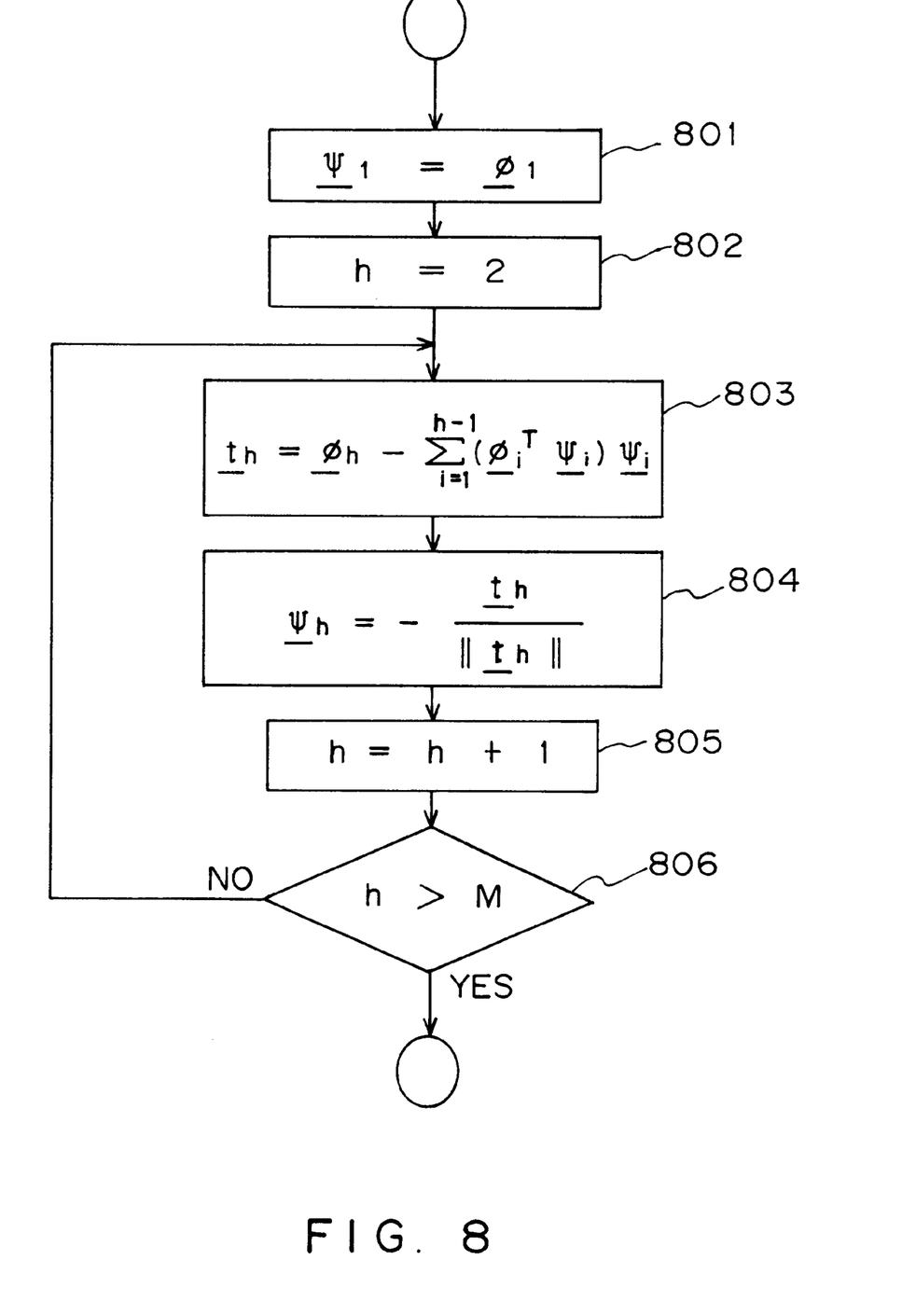
FIG. 8 is a flowchart showing the process of computing an orthonormal base vector.

FIG. 8 is a flowchart showing the detailed process in step 513 shown in FIG. 5.

First, the learning unit 302 performs a computing process using equation 19 in step 801.

The learning unit 302 sets the dimension number h to 2 in step 802, and then repeatedly performs the computing process in step 803 corresponding to equation 20 and the computing process in step 804 corresponding to equation 21, while incrementing the number h of dimensions by 1 until it is determined in step 806 that the dimension number h has exceeded the number M of dimensions.

After the characteristic vectors $\underline{\phi}_h$ have been computed by the conventional canonical determination analysis as described above according to the present embodiment, the orthonormal base vectors $\underline{\psi}_h$ are computed by a simple recurrence equation.

The learning unit 302 stores the above computed M orthonormal base vectors $\underline{\psi}_h$ ($1 \leq h \leq M$) in a orthonormal base storage unit 303 in a partial eigenspace in step 513 shown in FIG. 5.

Then, in step 514 shown in FIG. 5, the learning unit 302 computes an M-dimensional average selection feature vector $\underline{m}^{(i)'}$ for each character type i by computing an inner product of the above described M orthonormal base vectors $\underline{\psi}_h$ ($1 \leq h \leq M$) and the N-dimensional average feature vector $\underline{m}^{(i)}$ obtained in step 506 as shown by the following equation 22 for each character type i. Then, it stores the result in a recognition dictionary unit 304.

$$\underline{m}^{(i)'} = (m_h^{(i)'}) = (\underline{\psi}_1^T \underline{m}^{(i)}, \underline{\psi}_2^T \underline{m}^{(i)}, \ldots, \underline{\psi}_M^T \underline{m}^{(i)}) \tag{22}$$

where the subscript h indicates an element number of a selection feature vector in the range of $1 \leq h \leq M$. Thus, a feature selection process, that is, a process of reducing dimensions from N dimensions into M dimensions for an average feature vector for each character type forming part of the dictionary is performed. The feature selection process according to the present embodiment is equivalent to the process of projecting N-dimensional average feature vectors on M coordinate axes prescribed by M orthonormal base vectors $\underline{\psi}_h$, so that an inter-character-type variance can be increased while an inner-character-type variance can be decreased, as in the conventional technology. Since the M orthonormal base vectors $\underline{\psi}_h$ are orthogonal to each other, the above described projecting process is equivalent to the process of projecting the N-dimensional average characteristic vectors on the partial eigenspace of the original space. As a result, the distance between the vectors in the original feature space corresponds to the distance between the vectors in the partial eigenspace prescribed by M orthonormal base vectors $\underline{\psi}_h$, as described by referring to FIG. 4.

As described above, the learning unit 302 performs a learning process according to the flowchart shown in FIG. 5.

When a character is actually recognized, the feature extracting unit 301 extracts an N-dimensional feature vector $\underline{x}$ indicated by the above described equation 10 from the input character pattern having an unknown character type.

Then, a feature selecting unit 305 computes an M-dimensional selection feature vector $\underline{z}$ by obtaining the inner product of the M orthonormal base vectors $\underline{\psi}_h$ ($1 \leq h \leq M$) stored by the orthonormal base storage unit 303 in a partial eigenspace and the N-dimensional feature vector $\underline{x}$ as represented by the following equation 23.

$$\underline{z} = (z_h) = (\underline{\psi}_1^T \underline{x}, \underline{\psi}_2^T \underline{x}, \ldots, \underline{\psi}_M^T \underline{x})^T \tag{23}$$

Thus, an input characteristic vector is projected (feature selection) on an M-dimensional partial eigenspace.

Finally, a collating unit 306 computes, for example, an euclidean distance $d^{(i)}$ between an M-dimensional selection feature vector $\underline{z}$ and an average selection feature vector $\underline{m}^{(i)'}$ stored in the recognition dictionary unit 304 as represented by the following equation 24 for each character type i.

$$d^{(i)} = \left\{ \sum_{h=1}^{M} (z_h - m_h^{(i)'})^2 \right\}^{1/2} \tag{24}$$

The collating unit 306 outputs the character type i corresponding to the average selection feature vector $\underline{m}^{(i)'}$ having the shortest distance $d^{(i)}$, as an estimated character type corresponding to the input character pattern.

According to the above described preferred embodiment, the recognition can be considerably speeded up because the number of elements in the distance calculation is reduced from N terms to M terms as in the conventional technology. Furthermore, the present invention stores the distance value by projecting the feature vector on the partial eigenspace of the original feature space, thereby realizing a character recognizing apparatus having practical recognition precision.

It is estimated that the feature of the canonical determination analysis in which the inner-character-type variance is minimized and the inter-character-type variance is maximized is somewhat lost. From the experiments, the reduction in recognition ratio is more than compensated for by the improvement in recognition ratio from normalizing the distance computation through orthogonalization. Thus, the effectiveness of the present invention has been practically confirmed.

According to the above described preferred embodiment, the euclidean distance is used as the distance between vectors. However, the present invention is not limited to this application, but other distances based on the euclidean distance, a city block distance, a chess board distance, etc. can also be used. The city block distance d between vector $\underline{x}_1$ and vector $\underline{x}_2$ is defined by the following equation. However, $x_{1h}$ and $X_{2h}$ are elements of vectors $\underline{x}_1$ and $\underline{x}_2$ respectively. The distance computation is made in either the vertical or horizontal direction along the coordinate axis.

$$d = \sum_{h=1}^{M} |x_{1h} - x_{2h}| \quad (25)$$

The chess board distance d between vectors $\underline{x}_1$ and $\underline{x}_2$ is defined by the following equation. The shortest distance is computed in one of the vertical, horizontal, or diagonal directions along the coordinate axis.

$$d = \max_{h} |x_{1h} - x_{2h}| \quad (26)$$

The present invention is not limited to the character recognizing apparatus as described in the above preferred embodiment, but can also be applied to various pattern recognizing apparatuses.

Furthermore, the present invention also includes storage media such as a floppy disk, CD-ROM disk, optical disk, removable hard disk, etc. that store computer programs for realizing the above described pattern recognizing function.

Figure 10:
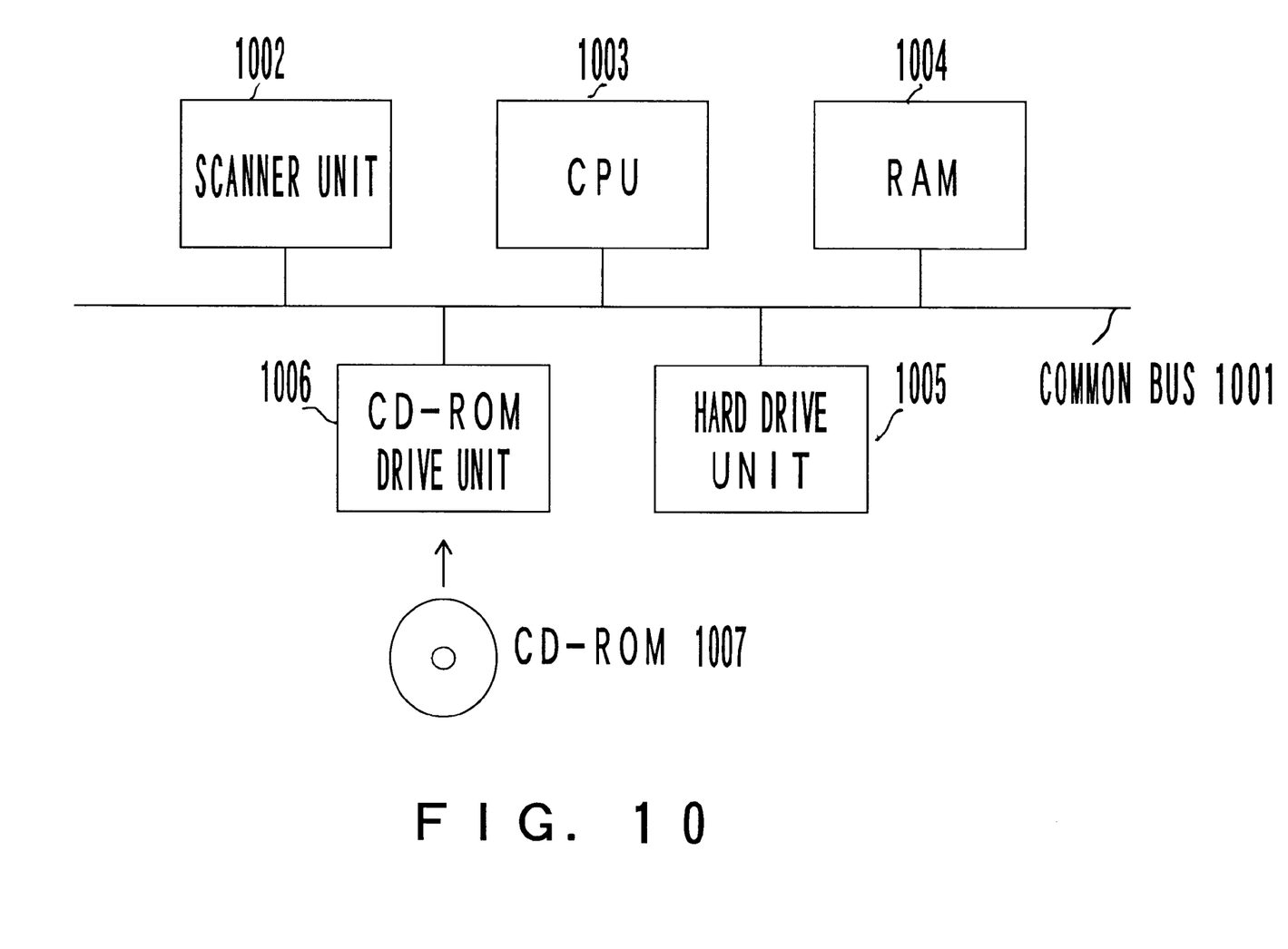
FIG. 10 shows the system structure which realizes a preferred embodiments.

FIG. 10 shows the system structure which realizes the above mentioned preferred embodiments.

A scanner unit 1001, a central processing unit (CPU) 1003, a random access memory (RAM) 1004, a hard drive unit 1005, and a cd-rom drive unit 1006 are connected to a common bus 1001.

A cd-rom media stores computer programs for realizing the above described pattern recognizing function. This programs are loaded into the hard drive unit 1005 through the cd-rom drive unit 1006 and the common bus 1001.

The CPU 1003 loads the programs into the RAM 1004 from the hard drive unit 1005 and executes them. As a result, the above mentioned pattern recognizing process is executed to character patterns read through the scanner unit 1002.

What is claimed is:

1. A pattern recognizing apparatus for recognizing an input pattern using a feature vector representing features of the input pattern, comprising:

input feature vector extracting means for extracting an input feature vector representing the features of the input pattern;

orthonormal base storage means for holding orthonormal bases of a partial eigenspace of an original feature space;

recognition dictionary means for storing each dictionary selection feature vector prescribed in the partial eigenspace corresponding to one or more object patterns to be recognized;

feature selection means for computing an input selection feature vector obtained by projecting the input feature vector extracted by said input feature vector extracting means on the partial eigenspace using the orthonormal bases stored by said orthonormal base storage means; and collating means for recognizing a type of the input pattern corresponding to the input selection feature vector by collating the input selection feature vector computed by said feature selection means with each dictionary selection feature vector stored by said recognition dictionary means.

2. A pattern learning apparatus, for use in the pattern recognizing apparatus according to claim 1, for computing the orthonormal base and each of the dictionary selection feature vectors, comprising:

learning feature vector extracting means for extracting a learning feature vector representing features of a learning pattern;

orthonormal base computing means for computing the orthonormal bases of the partial eigenspace based on a plurality of learning feature vectors extracted by said learning feature vector extracting means;

dictionary feature vector computing means for computing, based on a plurality of learning feature vectors extracted by said learning feature vector extracting means, each of the dictionary feature vectors prescribed in the original feature space corresponding to each of the object patterns to be recognized; and dictionary selection feature vector computing means for computing each of the dictionary selection feature vectors obtained by projecting each dictionary feature vector computed by said dictionary feature vector computing means on the partial eigenspace using the orthonormal bases computed by said orthonormal base computing means.

3. The pattern recognizing apparatus according to claim 1, wherein said orthonormal bases are computed by:

computing characteristic vectors of a predetermined number smaller than a number of dimensions of the original feature space in order from the one having a largest eigenvalue by performing a canonical determination analysis on the plurality of learning feature vectors; and computing a predetermined number of orthonormal base vectors by sequentially orthonormalizing the predetermined eigenvectors in order from the one having the largest eigenvalue.

4. The pattern recognizing apparatus according to claim 1, wherein said input selection feature vector or each of said dictionary selection feature vectors obtained by projecting the input feature vector or each of the dictionary feature vectors on the partial eigenspace is obtained by projecting the input feature vector or each of the dictionary feature vectors on the orthonormal base vectors.

5. The pattern recognizing apparatus according to claim 4, wherein said input selection feature vector or each of said dictionary selection feature vectors obtained by projecting the input feature vector or each of the dictionary feature vectors on the orthonormal base vectors is obtained as a result of computing each inner product of the input feature vector or each of the dictionary feature vectors and the orthonormal base vectors.

6. The pattern recognizing apparatus according to claim 1, wherein said dictionary selection feature vector is based on an average feature vector indicating an average of the feature vectors for each type of the object patterns to be recognized.

7. The pattern recognizing apparatus according to claim 1, wherein said input selection feature vector is collated with each of the dictionary selection feature vectors by computing the distance between the input selection feature vector with each of the dictionary selection feature vectors and by comparing obtained distance values with each other.

8. The pattern recognizing apparatus according to claim 7, wherein said distance is based on an euclidean distance.

9. The pattern recognizing apparatus according to claim 7, wherein said distance is based on a city block distance.

10. The pattern recognizing apparatus according to claim 7, wherein said distance is based on a chess board distance.

11. The pattern recognizing apparatus according to claim 1, wherein said pattern is a character pattern.

12. A pattern recognizing method for recognizing an input pattern using an input feature vector representing features of the input pattern, comprising the steps of:

extracting the input feature vector representing the features of the input pattern;

storing orthonormal bases of a partial eigenspace of an original feature space;

storing each of dictionary selection feature vectors prescribed in the partial eigenspace corresponding to one or more object patterns to be recognized;

computing an input selection feature vector obtained by projecting the input feature vector extracted corresponding to the input pattern on the partial eigenspace using the orthonormal bases; and recognizing a type of the input pattern corresponding to the input selection feature vector by collating the input selection feature vector with each of the dictionary selection feature vectors.

13. A pattern learning method, for use in the pattern recognizing method according to claim 12, for computing the orthonormal bases and each of the dictionary selection feature vectors, comprising the steps of:

extracting a learning feature vector representing features of a learning pattern;

computing the orthonormal bases of the partial eigenspace based on a plurality of extracted learning feature vectors;

computing using the plurality of learning feature vectors each of dictionary feature vectors prescribed in the original feature space corresponding to each of the object patterns to be recognized; and computing using the orthonormal bases each of the dictionary selection feature vectors obtained by projecting each of the dictionary feature vectors on the partial eigenspace.

14. A pattern recognizing apparatus for recognizing an input pattern using an input feature vector representing features of the input pattern, comprising:

feature vector extracting means for extracting an input feature vector representing the features of the input pattern or a learning feature vector representing features of a learning pattern;

orthonormal base storage means for storing orthonormal bases of a partial eigenspace of an original feature space;

recognition dictionary means for storing each dictionary selection feature vector prescribed in the partial eigenspace corresponding to one or more object patterns to be recognized;

orthonormal base computing means for computing the orthonormal bases of the partial eigenspace based on a plurality of learning feature vectors extracted by said feature vector extracting means, and for storing computation results in said orthonormal base storage means;

dictionary feature vector computing means for computing, based on the plurality of learning feature vectors extracted by said feature vector extracting means, each of the dictionary feature vectors prescribed in the original feature space corresponding to each of the object patterns to be recognized;

dictionary selection feature vector computing means for computing each of the dictionary selection feature vectors obtained by projecting each dictionary feature vector computed by said dictionary feature vector computing means on the partial eigenspace using the orthonormal bases computed by said orthonormal base computing means, and for storing computation results in said recognition dictionary means;

feature selection means for computing an input selection feature vector obtained by projecting the input feature vector of the input pattern extracted by said feature vector extracting means on the partial eigenspace using the orthonormal bases stored by said orthonormal base storage means; and collating means for recognizing a type of the input pattern corresponding to the input selection feature vector by collating the input selection feature vector computed by said feature selection means with each dictionary selection feature vector stored by said recognition dictionary means.

15. A computer-readable medium used to direct a computer to perform the steps of:

extracting the input feature vector representing the features of the input pattern;

storing orthonormal bases of a partial eigenspace of an original feature space;

storing each of dictionary selection feature vectors prescribed in the partial eigenspace corresponding to one or more object patterns to be recognized;

computing an input selection feature vector obtained by projecting the input feature vector extracted corresponding to the input pattern on the partial eigenspace using the orthonormal bases; and recognizing a type of the input pattern corresponding to the input selection feature vector by collating the input selection feature vector with each of the dictionary selection feature vectors.

16. A computer-readable medium used to direct a computer to perform the steps of:

extracting a learning feature vector representing features of a learning pattern;

computing the orthonormal bases of the partial eigenspace based on a plurality of extracted learning feature vectors;

computing, based on the plurality of learning feature vectors, each of dictionary feature vectors prescribed in the original feature space corresponding to each of the object patterns to be recognized; and computing each of the dictionary selection feature vectors obtained by projecting each of the dictionary feature vectors on the partial eigenspace.

* * * * *